(No Model.)
E. G. PAKE.
BAND SAW GUIDE AND COOLER.
No. 495,830. Patented Apr. 18, 1893.
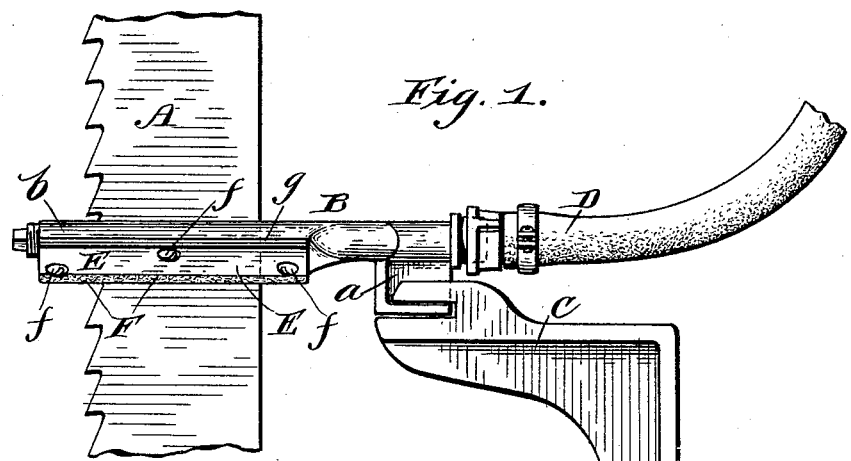
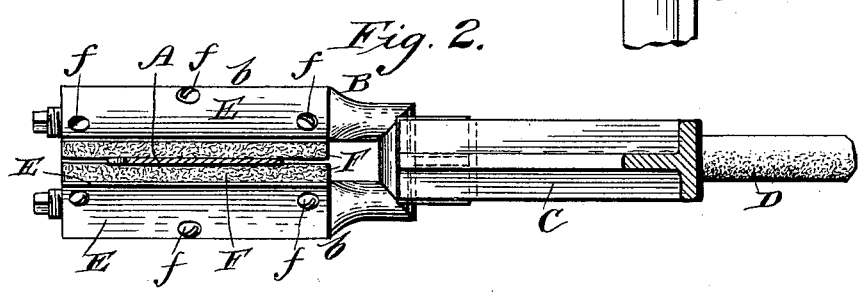
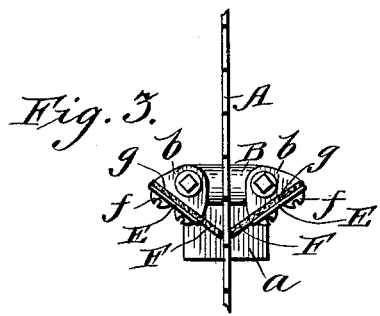
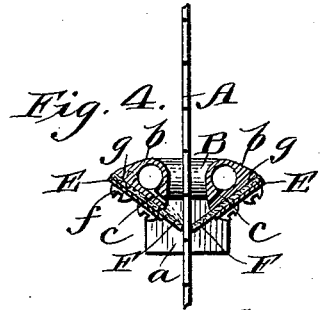
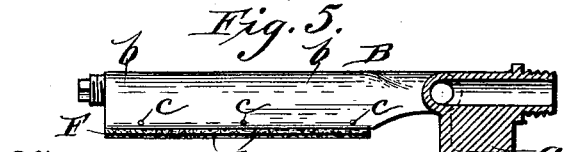
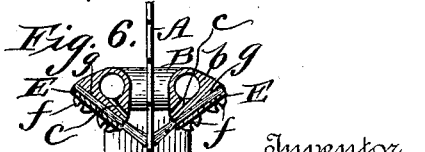
Witnesses
A. Severance
C. Calvert Hines
Inventor
Edward G. Pake
by
Mason, Fenwick & Lawrence
Attorneys.

UNITED STATES PATENT OFFICE.

EDWARD G. PAKE, OF DULUTH, MINNESOTA.

BAND-SAW GUIDE AND COOLER.

SPECIFICATION forming part of Letters Patent No. 495,830, dated April 18, 1893.

Application filed December 5, 1892. Serial No. 454,167. (No model.)

*To all whom it may concern:*

Be it known that I, EDWARD G. PAKE, a subject of the Queen of Great Britain, residing at Duluth, in the county of St. Louis and State of Minnesota, have invented certain new and useful Improvements in Band-Saw Guides and Coolers; and I do hereby declare the following to be a full, clear, and exact description of the invention, such as will enable others skilled in the art to which it appertains to make and use the same.

My invention relates to means for cooling, rapidly moving endless band saws of sawmills, and its object is to so improve the water and fluid supplying devices heretofore employed for preventing the heating of the saw blades, and thereby avoid delays from such cause, by insuring the retention of the cooling agent at the point or points where it is applied upon the saw, and thus overcoming the difficulty resulting from the draft or suction produced by the saw, forcing the water away from the saw before it has sufficient time to impart its cooling action thereto.

My invention consists in providing hollow, perforated band saw-guides, with a screw plate or plates, and with a strip or strips of felt or other suitable material of a capillary character, applied between the under side of the saw guide arm, or arms, and a screw plate or plates, said capillary strip extending nearly down to or in contact relation with the broad flat surface of the saw blade, and, as the water is constantly and forcibly supplied, or otherwise, serving for conducting it down and directing it positively against the saw blade and retaining it in contact with the same a sufficient length of time to insure its cooling properties being imparted to the blade, whereupon the water flows or drops away in its partly heated condition to make place for the cold water following behind it from the source of supply and through the hollow chamber or chambers, and upon the felt or analogous capillary conductor of the saw guide.

In the accompanying drawings Figure 1 is a side elevation of a portion of a band saw supposed to be arranged to run on horizontal pulleys one above the other, and of my improved saw cooling and guiding device. Fig. 2 is a horizontal section of the saw and a bottom view of the guiding and cooling device. Fig. 3 is a front view of the saw cooling device, and of a portion of the cutting edge of the saw blade. Fig. 4 is a similar view to Fig. 3, except that the guiding and cooling device is shown in cross section. Fig. 5 is a vertical longitudinal section of the guiding and cooling device, and Fig. 6 is a section similar to Fig. 4, showing brushes substituted for the felt or other woven capillary fabric.

A in the drawings represents a band saw, and B the saw guide formed with a vertical bracket $a$, whereby it is adapted to be connected to a standard C of the saw-mill frame, as illustrated. The saw guide consists of two hollow guiding arms $b$, of nearly V form in cross section, and a hollow T-head, connecting the arm. To the T head a water supply pipe D, is connected, said pipe leading from a water supply or source, which is under pressure, and preferably constant. The guiding arms are perforated at $c$, along their length, and they serve to guide the saw and supply water to its broad surfaces for cooling it. The guiding device thus far described, has heretofore been used for supplying water to the saw for the purpose of keeping it cool, but not with that success which is desired, from the fact that the rapid rate of the saw blade creates a draft or suction which draws or forces the water on the instant of its discharge, away from the blade, and thus destroys the object sought. To overcome this difficulty, I provide one or both of the guiding arms with a clamping plate E, which is confined to the under inclined flat side $g$, of the guide arm by screws $f$, as shown. Between the plate and the arm a strip F, of felt or other capillary substance, is placed and arranged so that the inner lower edge touches or nearly touches the broad surface of the saw blade. If two clamping plates and two felt strips are employed, both surfaces of the saw will be supplied with water. By my invention, the water supplied to the hollow arm and discharged through the passages, is absorbed by the felt strips and conducted positively by the same upon the saw blade, and the blade thereby kept cool, the water which takes up the heat of the saw blade flowing or dropping off as it is displaced by the fresh water, following through the hollow arms and discharge passages therein.

Instead of felt or canvas, brushes or any other suitable flexible, capillary conducting material may be applied between the arm and clamping plates, for the purpose herein described, and a long narrow slit, or a series of slits, instead of the perforation for the discharge of the water, may be adopted.

The guiding and cooling device may be of any suitable form and size, according to arrangement, size and requirements of the saw.

It will be observed that the water supplied to the saw for cooling the same will be conducted onto the pulleys and thereby keep them clean and prevent dust and pitch sticking to and gumming them.

What I claim as my invention is—

1. The combination with a hollow perforated saw guiding and water conducting and discharging device, of a clamping plate, and a strip of flexible, capillary material extending to, or nearly to the surface of the saw, and confined to an arm of the guide by a clamping plate, so that a portion of its width is adapted for conducting water to the saw, and holding the same in contact therewith a sufficient length of time for imparting its cooling properties to the saw, the said free portion of the flexible material being arranged in proper relation to the discharging passages of the guiding arm for receiving the discharged water, substantially as described.

2. The combination with the hollow and perforated bifurcated saw guide, having an inlet, and outlet water passage, of strips of felt or other capillary material, and clamping plates fastened by screws, whereby the water is conducted to and held against both sides of the saw, and facilities afforded for adjusting the material as it is worn away, substantially as described.

3. A strip of flexible capillary fabric, in combination with a water circulating hollow arm of a saw guide, said arm being perforated on its inner side along its length and open at its end, and serving for having the fabric clamped upon it, and for receiving, conducting and equably distributing the flowing water which is constantly being introduced into the chamber of the guide, and the fabric absorbing and serving for conducting the water to the saw blade for the purpose of cooling it, substantially as shown and described.

4. A band saw guide comprising a vertical bracket, two hollow perforated arms, a hollow T-head connection at one end of the two arms, clamping plates confined by suitable fastenings, and strips of porous water conducting material such as felt, for instance, clamped by the plate to the hollow arms so that a portion of their width is left unconfined and lies close to the band saw, substantially as described.

In testimony whereof I hereunto affix my signature in presence of two witnesses.

EDWARD G. PAKE.

Witnesses:
ALBERT BALDWIN,
O. E. W. MILLER.